United States Patent

Sawamura et al.

[11] Patent Number: 5,890,994
[45] Date of Patent: Apr. 6, 1999

[54] OUTPUT TORQUE CONTROL SYSTEM FOR INTERNAL COMBUSTION ENGINES FOR VEHICLES

[75] Inventors: Kazutomo Sawamura; Yoshiharu Saito; Shigetaka Kuroda, all of Wako, Japan

[73] Assignee: Honda Giken Kogyo Kabushiki Kaisha, Tokyo, Japan

[21] Appl. No.: 848,522

[22] Filed: Apr. 28, 1997

[30] Foreign Application Priority Data

Apr. 30, 1996 [JP] Japan ..................... 8-132774

[51] Int. Cl.[6] .............................. F02D 41/04
[52] U.S. Cl. .................. 477/181; 477/83; 477/176
[58] Field of Search .................... 477/176, 169, 477/174, 175, 181, 107, 111, 70, 73, 77, 83; 701/67

[56] References Cited

U.S. PATENT DOCUMENTS

| | | | |
|---|---|---|---|
| 5,036,729 | 8/1991 | Nitz et al. | 477/148 |
| 5,322,150 | 6/1994 | Schmidt-Brucken et al. | 477/176 |
| 5,569,117 | 10/1996 | Kono et al. | 477/176 X |
| 5,588,937 | 12/1996 | Kono et al. | 477/169 |
| 5,643,136 | 7/1997 | Kono et al. | 477/174 X |
| 5,678,667 | 10/1997 | Kono et al. | 477/176 X |
| 5,697,479 | 12/1997 | Kono et al. | 477/176 X |
| 5,733,223 | 3/1998 | Matsubara et al. | 477/175 |
| 5,738,606 | 4/1998 | Bellinger | 477/111 |
| 5,816,976 | 10/1998 | Kuroiwa et al. | 477/110 X |

FOREIGN PATENT DOCUMENTS 5-321707  12/1993  Japan .

Primary Examiner—Dirk Wright
Assistant Examiner—Peter T. Kwon
Attorney, Agent, or Firm—Armstrong, Westerman, Hattori, McLeland & Naughton

[57] ABSTRACT

An output torque control system for an internal combustion engine for a vehicle is operable during an upshift of an automatic transmission of the engine to increase the output torque from the engine, based on a control amount for increasing the output torque, to reduce a shock generated by the upshift. During the upshift of the automatic transmission, a slip amount of one of a plurality of clutches of the automatic transmission which is selected for the upshift is compared with a predetermined value. A calculation is made of a value of the control amount assumed when the slip amount of the one clutch becomes equal to the predetermined value, as a result of the comparison. The control amount is limited to the calculated value when the slip amount exceeds the predetermined value, as a result of the comparison.

5 Claims, 12 Drawing Sheets

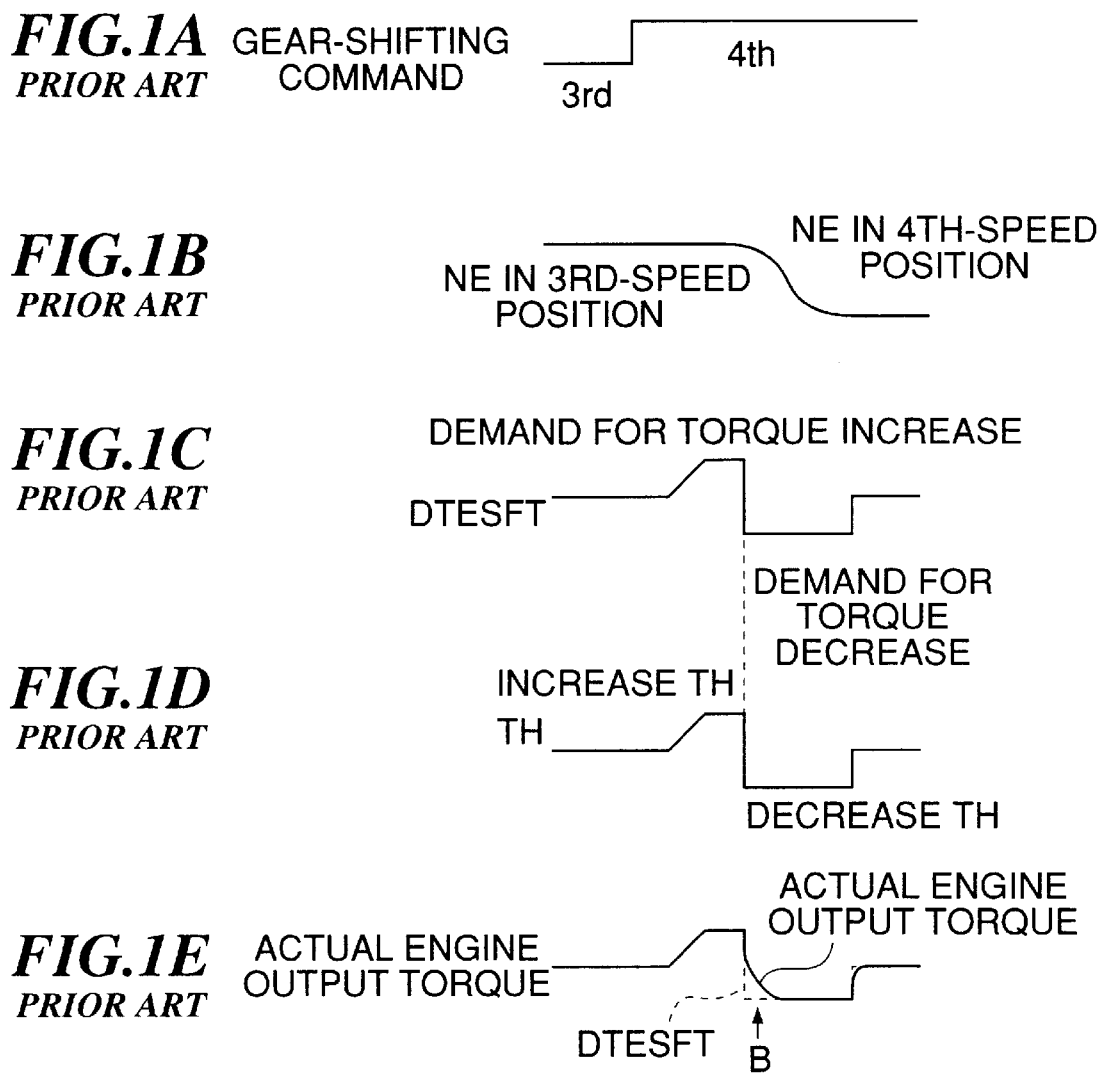

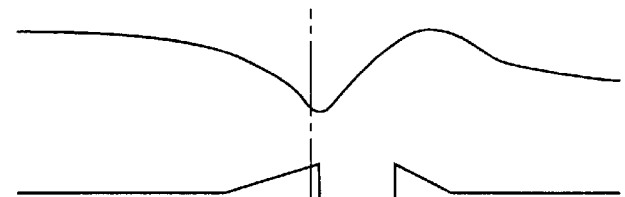
FIG.2A PRIOR ART — DRIVING FORCE
FIG.2B PRIOR ART — TH
FIG.2C PRIOR ART — NE
FIG.2D PRIOR ART — HYDRAULIC PRESSURE
FIG.2E PRIOR ART — TORQUE FIG.3A PRIOR ART — DRIVING FORCE
FIG.3B PRIOR ART — TH
FIG.3C PRIOR ART — NE
FIG.3D PRIOR ART — HYDRAULIC PRESSURE
FIG.3E PRIOR ART — TORQUE
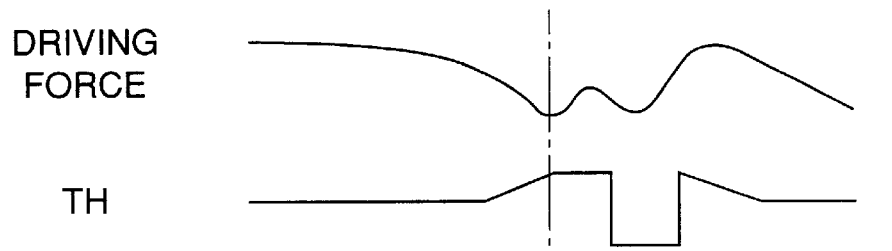
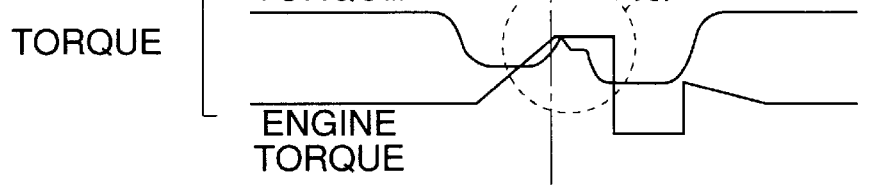

FIG.4A DRIVING FORCE
*PRIOR ART*
FIG.4B TH
*PRIOR ART*
FIG.4C NE
*PRIOR ART*
FIG.4D HYDRAULIC PRESSURE
*PRIOR ART*
FIG.4E TORQUE
*PRIOR ART*
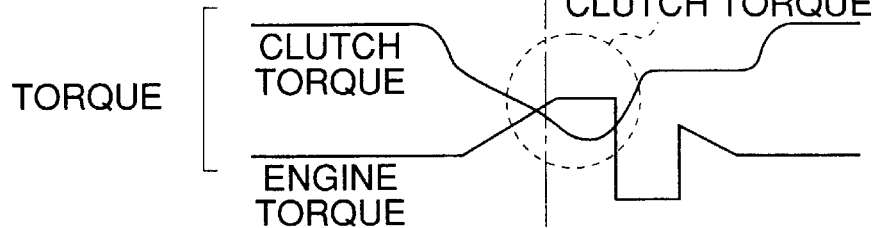

*PRIOR ART*  DRIVING FORCE

*PRIOR ART*  HYDRAULIC PRESSURE

*PRIOR ART*  TORQUE

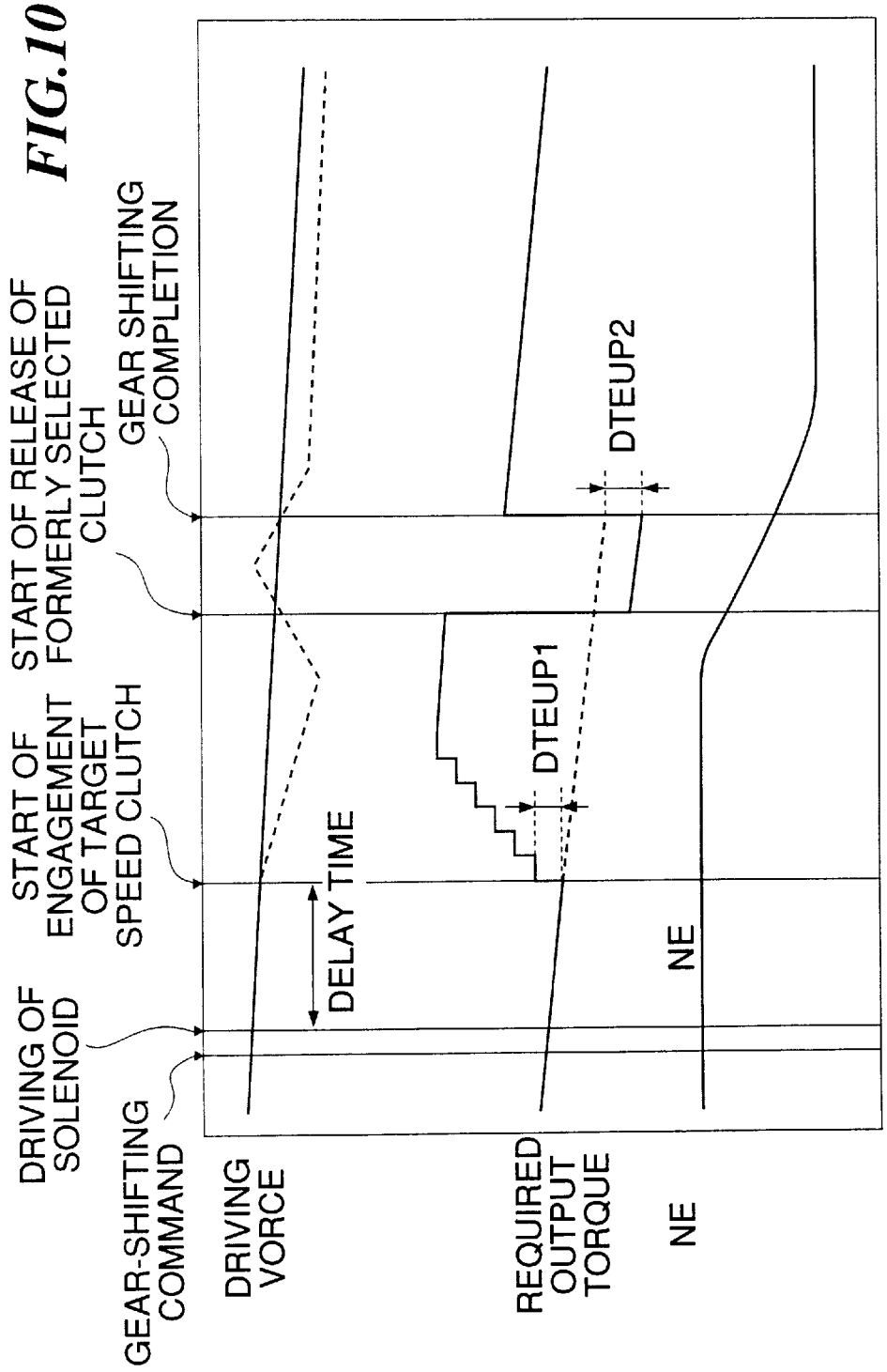

OUTPUT TORQUE CONTROL SYSTEM FOR INTERNAL COMBUSTION ENGINES FOR VEHICLES

BACKGROUND OF THE INVENTION

1. Field of the Invention

This invention relates to an output torque control system for internal combustion engines for vehicles, which controls output torque from the engine so as to reduce a shock generated during gear shifting of an automatic transmission of the engine.

2. Prior Art

Conventionally, there is known a throttle valve control system for internal combustion engines for vehicles, e.g. from Japanese Laid-Open Patent Publication (Kokai) No. 5-321707, which changes the output torque from the engine in order to reduce a shock generated during gear shifting of an automatic transmission of the engine.

According to the known throttle valve control system, when the automatic transmission is upshifted, a throttle actuator is controlled to regulate the opening of a throttle valve of the engine such that the output torque from the engine is once increased in a so-called torque phase of the transmission and then the engine output torque is decreased to a value smaller than a value assumed before the upshift, in a so-called inertia phase of the transmission. As a result, a shock caused by a drop in the driving force of the vehicle in the torque phase and a subsequent shock caused by a sharp rise in the driving force in the inertia phase can be suppressed during the upshift.

FIG. 1 shows a timing chart useful in explaining a manner of changing the output torque from the engine by the throttle valve control, according to the prior art. As shown in the figure, when a command for gear shifting from a third-speed position to a fourth-speed position of the transmission (upshift) is issued, the throttle valve opening TH is progressively increased during an early stage of the upshift, based on a torque correction amount DTESFT which is then set to a value for increasing the engine output torque, whereby the actual engine output torque is increased according to the increased throttle valve opening TH. During a later stage of the upshift, the throttle valve opening TH is decreased to a value smaller than a value assumed before the start of the upshift, based on the torque correction amount DTESFT which is then set to a value for decreasing the engine output torque, whereby the actual engine output torque is decreased. Thus, the engine output torque can be smoothly changed, to thereby reduce a shock generated during the upshift.

The clutch engaging force of the transmission which determines the amount of torque transmitted through the transmission (hereinafter referred to as "the clutch torque") is determined mainly by hydraulic pressure applied on a clutch of a formerly selected speed position (released clutch) and the friction coefficient of the released clutch, as well as hydraulic pressure applied on a clutch of a target speed position (engaged clutch) and the friction coefficient of the engaged clutch. Normally, the clutch torque is sufficiently larger than the output torque from the engine. Therefore, even if the engine output torque is increased, e.g. by controlling the throttle valve, the engine output torque is transmitted from a main shaft of a gear mechanism of the transmission through the selected speed clutch to a counter shaft of the gear mechanism.

According to the conventional throttle valve control system, however, the engine output torque is increased on the premise that the clutch torque is always larger than the engine output torque. Consequently, if the clutch torque falls below the engine output torque, the following inconvenience is incurred:

FIGS. 2 to 5 are timing charts showing the relationship between various parameters assumed during an upshift according to the prior art, in which FIG. 2 shows changes in the parameters assumed during an upshift when the clutch torque is normal, while FIGS. 3 to 5 each show changes in the parameters assumed during an upshift when the clutch torque is abnormal.

As shown in FIG. 2, when the clutch torque is normal, it is sufficiently larger than the engine output torque.

FIG. 3 shows a case where an upshift is carried out, when the clutch torque lowers because the friction coefficient μ of the selected clutch lowers due to aging or deterioration of the clutch. When the friction coefficient lowers, the curve indicative of the clutch torque generally shifts downward as viewed in the figure such that it can be lower than the curve indicative of the engine output torque during the upshift.

FIG. 4 shows another case where an upshift is carried out, when the hydraulic pressure for operating the target speed position clutch rises with a delay. When the transmission has been continuously held in a parking position or in a neutral position over some period of time, the hydraulic oil for operating the formerly selected clutch is progressively drained from an oil passage for the released clutch. Once the hydraulic oil has been completely drained out of the oil passage, it takes a considerable time period for an oil passage for the engaged clutch to be filled with the hydraulic oil, resulting in a delayed rise in the hydraulic pressure for operating the clutch. Also when the hydraulic oil is low in temperature and high in viscosity, the hydraulic pressure for operating the clutch rises with a delay, similarly. If the hydraulic pressure rises with a delay, the clutch torque during an upshift can decrease below the engine output torque, as shown in the figure.

FIG. 5 shows a further case where an upshift is carried out, when the hydraulic pressure for operating the formerly selected clutch is quickly drained. If the hydraulic oil is high in temperature and low in viscosity, the hydraulic pressure for operating the formerly selected clutch is quickly drained. Also when a valve for switching a restriction through which the hydraulic oil passes is defective, the drain speed increases. When the hydraulic pressure for operating the formerly selected clutch is quickly drained, the clutch torque can decrease below the engine output torque during an upshift, as shown in the figure.

When the clutch torque decreases below the engine output torque due to a decrease in the friction coefficient of the selected clutch, variations in the rise speed of the hydraulic pressure for operating the clutch or the like, there occurs a slip in the selected clutch, resulting in a rise in the engine rotational speed NE. The slip of the clutch causes increased generation of heat and hence degraded durability of the selected clutch. Further, the increased engine rotational speed NE can cause an increased gear-shifting shock.

SUMMARY OF THE INVENTION

It is the object of the invention to provide an output torque control system for internal combustion engines for vehicles, which is capable of preventing degradation of the durability of a selected speed clutch of the automatic transmission, due to heat caused by a slip in the clutch during an upshift, while reducing a shock generated during the upshift.

To attain the above object, the present invention provides an output torque control system for an internal combustion engine for a vehicle, the engine having an automatic transmission having a plurality of clutches, the control system being operable during an upshift of the automatic transmission, for increasing output torque from the engine, based on a control amount for increasing the output torque, to reduce a shock generated by the upshift, the control system comprising:

comparing means operable during the upshift of the automatic transmission, for comparing a slip amount of one of the plurality of the clutches of the automatic transmission which is selected for the upshift with a predetermined value;

control amount-calculating means for calculating a value of the control amount assumed when the slip amount of the one clutch becomes equal to the predetermined value, as a result of the comparison by the comparing means; and limiting means for limiting the control amount to the value calculated by the control amount-calculating means when the slip amount exceeds the predetermined value, as a result of the comparison by the comparing means.

According to the invention, when it is detected that a slip amount of the selected speed clutch of the automatic transmission exceeds the predetermined value, the control amount for increasing the output torque from the engine is limited to the amount calculated when the slip amount of the selected speed clutch becomes equal to the predetermined value. As a result, degradation of the durability of the selected clutch due to heat caused by a slip in the clutch can be prevented while a shock generated during an upshift is reduced.

Preferably, the slip amount of the one clutch is detected based on rotational speed of an input side of the automatic transmission and rotational speed of an output side of the automatic transmission.

More preferably, the comparing means detects that the slip amount exceeds the predetermined value when a ratio of the rotational speed of the output side of the automatic transmission to the rotational speed of the input side of the automatic transmission falls below a predetermined threshold value.

Preferably, the output torque control system includes control amount ratio-calculating means for calculating a control amount ratio of the value of the control amount assumed when the slip amount of the one clutch becomes equal to the predetermined value to a value of the control amount assumed when no slip occurs in the one clutch, and learning means for learning the control amount ratio calculated by the control amount ratio-calculating means.

More preferably, the limiting means limits the control amount to a value obtained by multiplying the value of the control amount assumed when no slip occurs in the one clutch by the control amount ratio calculated by the control amount ratio-calculating means.

The above and other objects, features, and advantages of the invention will be more apparent from the following detailed description taken in conjunction with the accompanying drawings.

BRIEF DESCRIPTION OF THE DRAWINGS

FIGS. 1A–1E are a timing chart useful in explaining a manner of changing output torque from an internal combustion engine by throttle valve control during an upshift, according to the prior art;

FIGS. 2A–2E are a timing chart showing changes in parameters assumed during an upshift when the clutch torque is normal, according to the prior art;

FIGS. 3A–3E are a timing chart showing changes in the parameters assumed during an upshift when the clutch torque is abnormal due to aging or deterioration of a selected clutch of the automatic transmission;

FIGS. 4A–4E are a timing chart showing changes in the parameters assumed during an upshift when the hydraulic pressure for operating the selected clutch rises with a delay;

FIG. 10 is a timing chart showing the relationship in timing between the driving force of the vehicle, required engine output torque and the engine rotational speed NE during an upshift;

DETAILED DESCRIPTION

The invention will now be described in detail with reference to the drawings showing an embodiment thereof.

Figures 5A, 5B, 5C, 5D, 5E:
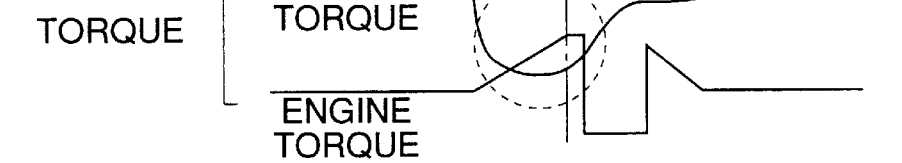
FIGS. 5A–5E are a timing chart showing changes in the parameters assumed during an upshift when the hydraulic pressure for operating the selected clutch is quickly drained.
Figure 6:
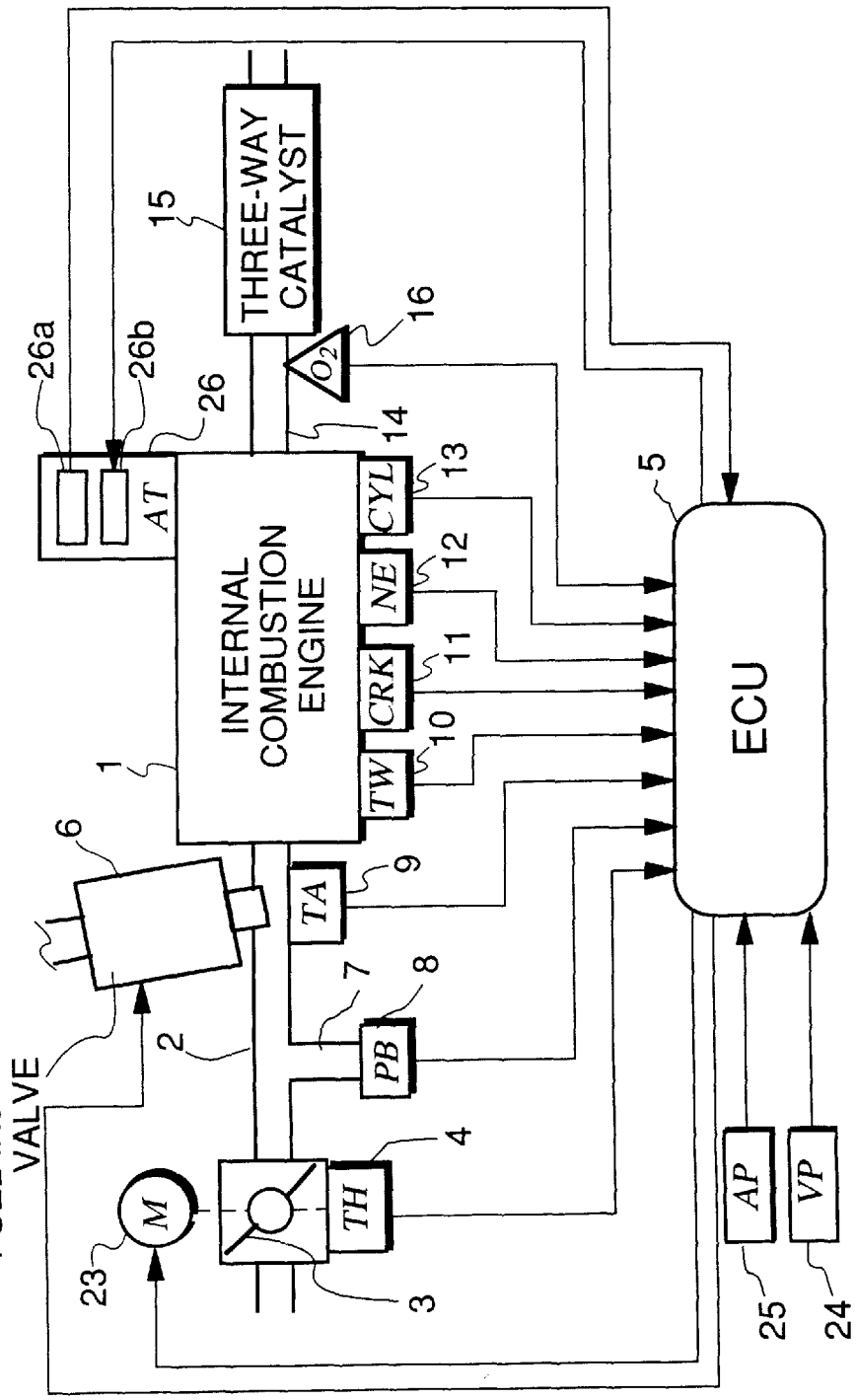
FIG. 6 is a block diagram schematically showing the whole arrangement of an internal combustion engine and an output torque control system therefor, according to an embodiment of the invention.

Referring first to FIG. 6, there is illustrated the whole arrangement of an internal combustion engine (hereinafter simply referred to as "the engine") and an output torque control system therefor, according to an embodiment of the invention.

In the figure, reference numeral 1 designates an internal combustion engine for an automotive vehicle, which has a cylinder block to which is connected an intake pipe 2. A throttle valve 3 is arranged in the intake pipe 2. A throttle valve opening (TH) sensor 4 is connected to the throttle valve 3 and electrically connected to an electronic control unit (hereinafter referred to as "the ECU") 5, for supplying an electric signal indicative of the sensed throttle valve opening TH to the ECU 5.

Further electrically connected to the ECU 5 are a throttle actuator 23 for driving the throttle valve 3 and an accelerator pedal position (AP) sensor 25 for detecting the position AP of an accelerator pedal of the vehicle, not shown. The ECU 5 controls the operation of the throttle actuator 23 in response to the accelerator pedal position AP detected by the accelerator pedal position sensor 25.

Fuel injection valves 6, only one of which is shown, are inserted into the intake pipe 2 at locations intermediate between the cylinder block of the engine 1 and the throttle valve 3 and slightly upstream of respective intake valves, not shown. The fuel injection valves 6 are connected to a fuel pump, not shown, and electrically connected to the ECU 5 to have their valve opening periods controlled by signals therefrom.

On the other hand, an intake pipe pressure (PB) sensor 8 is communicated with the interior of the intake pipe 2 via a conduit 7 at a location immediately downstream of the throttle valve 3, for sensing absolute pressure or intake pressure (PB) within the intake pipe 2, and is electrically connected to the ECU 5, for supplying an electric signal indicative of the sensed absolute pressure PB to the ECU 5. Further, an intake air temperature (TA) sensor 9 is inserted into the intake pipe 2 at a location downstream of the conduit 7, for supplying an electric signal indicative of the sensed intake air temperature TA to the ECU 5.

An engine coolant temperature (TW) sensor 10, which may be formed of a thermistor or the like, is mounted in the cylinder block of the engine 1 which is filled with engine coolant, for supplying an electric signal indicative of the sensed engine coolant temperature TW to the ECU 5.

A cylinder-discriminating sensor (hereinafter referred to as "the CYL sensor") 13, an engine rotational speed (NE) sensor 12, and a crank angle (CRK) sensor 11 are arranged in facing relation to a camshaft or a crankshaft of the engine 1, neither of which is shown. The CYL sensor 13 generates a signal pulse (hereinafter referred to as "a CYL signal pulse") at a predetermined crank angle of a particular cylinder of the engine 1. The NE sensor 12 generates a signal pulse (hereinafter referred to as "a TDC signal pulse") at each of predetermined crank angles (e.g. whenever the crankshaft rotates through 180 degrees when the engine is of the 4-cylinder type) which each correspond to a predetermined crank angle before a top dead point (TDC) of each cylinder corresponding to the start of the intake stroke of the cylinder. The CRK sensor 11 generates a signal pulse (hereinafter referred to as "a CRK signal pulse") at one of predetermined crank angles (e.g. whenever the crankshaft rotates through 30 degrees) with a predetermined repetition period shorter than the repetition period of TDC signal pulses. The CYL signal pulse, TDC signal pulse, and CRK signal pulse are supplied to the ECU 5.

Further connected to the ECU 5 is an automatic transmission 26 which is a conventional type and provided with a hydraulic pressure control circuit 26b for controlling the operations of a lock-up clutch and a gear mechanism of the transmission, neither of which is shown, and a gear position sensor 26a for detecting the shift position of the gear mechanism. The hydraulic pressure control circuit 26b and the gear position sensor 26a are electrically connected to the ECU 5. The hydraulic pressure control circuit 26b drives gear-shifting linear solenoid valves, not shown, of the gear mechanism for controlling hydraulic pressure for operating clutches of the transmission.

A three-way catalyst (catalytic converter) 15 is arranged in an exhaust pipe 14 of the engine 1, for purifying noxious components in exhaust gases emitted from the engine 1, such as HC, CO, and NOx. An oxygen concentration sensor (hereinafter referred to as "the O2 sensor") 16 as an air-fuel ratio sensor is arranged in the exhaust pipe 14 at a location upstream of the catalytic converter 15, which detects the concentration of oxygen present in exhaust gases and supplies an electric signal indicative of the sensed oxygen concentration to the ECU 5. Further electrically connected to the ECU 5 is a vehicle speed sensor 24 for detecting the traveling speed (vehicle speed) V of the automotive vehicle in which the engine 1 is installed and supplying a signal indicative of the sensed vehicle speed V to the ECU 5.

The ECU 5 is comprised of an input circuit having the functions of shaping the waveforms of input signals from various sensors, shifting the voltage levels of sensor output signals to a predetermined level, converting analog signals from analog-output sensors to digital signals, and so forth, a central processing unit (hereinafter referred to as the "the CPU"), memory means storing various operational programs which are executed by the CPU, and for storing results of calculations therefrom, etc., and an output circuit which supplies driving signals to the fuel injection valves 6, the throttle actuator 23, etc., and also supplies control signals to the hydraulic control circuit 26.

The CPU of the ECU 5 operates in response to signals from various engine operating parameter sensors including those mentioned above to determine operating conditions in which the engine 1 is operating, such as an air-fuel ratio feedback control region in which air-fuel ratio control is carried out in response to oxygen concentration in exhaust gases detected by the O2 sensor 16, and air-fuel ratio open-loop control regions, and calculates, based upon the determined engine operating conditions, a fuel injection time period Tout for each of the fuel injection valves 6, in synchronism with generation of TDC signal pulses, by the use of the following equation (1):

$$Tout = Ti \times KO2 \times K1 + K2 \tag{1}$$

where Ti represents a basic value of the fuel injection period Tout, which is determined according to the engine rotational speed NE and the intake pipe absolute pressure PBA, by the use of a Ti map, not shown, and stored in the memory means.

K02 represents an air-fuel ratio correction coefficient calculated based on the output signal from the O2 sensor 16, which is calculated to such a value that the air-fuel ratio of an air-fuel mixture supplied to the engine 1 becomes equal to a desired air-fuel ratio when the engine 1 is operating in the air-fuel ratio feedback control region, while it is set to predetermined values corresponding to the respective air-fuel ratio open-loop control regions of the engine 1 when the engine 1 is in these open-loop control regions.

K1 and K2 represent other correction coefficients and correction variables, respectively, which are set according to engine operating parameters to such values as optimize engine operating characteristics, such as fuel consumption and engine accelerability.

Driving signals corresponding to the TOUT values calculated as above are delivered via the output circuit to the fuel injection valves 6 to drive them.

Further, the CPU controls the engaged state of the lock-up clutch, the shift position of the gear mechanism, the valve opening TH of the throttle valve 3 in response to outputs signals from various engine operating parameter sensors.

Figure 7:
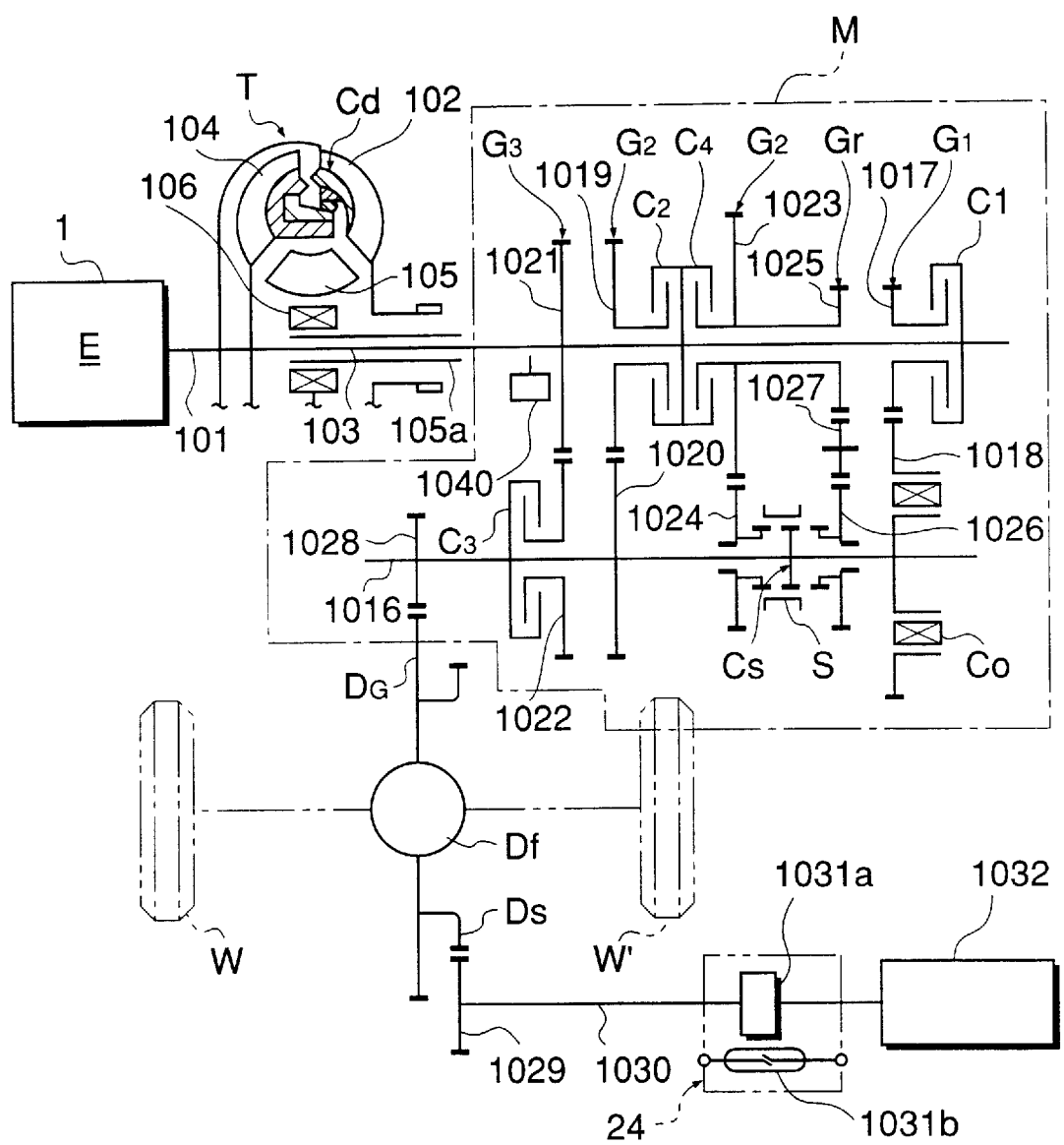
FIG. 7 is a diagram schematically showing the construction of an automatic transmission appearing in FIG. 6.

FIG. 7 shows the construction of the automatic transmission 26. Output from the engine 1 is transmitted to left and right driving wheels W and W' of the vehicle through the crankshaft 101 of the engine, a hydraulic torque converter T, an auxiliary transmission M, and a differential Df in the mentioned order.

The hydraulic torque converter T is comprised of a pump 102 coupled to the crankshaft 101, a turbine 104 coupled to an input shaft (main shaft) 103 of the auxiliary transmission M, and a stator 105 coupled, via a one-way clutch 106, to a stator shaft 105a which in turn is supported on the input shaft 103 for rotation relative thereto. Torque is transmitted from the crankshaft 101 to the pump 102, and then to the turbine 104 in a hydrodynamic manner. When amplification of torque takes place while torque is transmitted from the pump 102 to the turbine 104, the resulting reaction force is borne by the stator 105, as is well known.

A lock-up clutch Cd is interposed between the pump 102 and the turbine 104 for mechanically coupling them together.

The auxiliary transmission M has an output shaft (counter shaft) 1016 extending in parallel with the input shaft 103, and is provided with a first-speed gear train G1, a second-speed gear train G2, a third-speed gear train G3, a fourth-speed gear train G4, and a reverse gear train Gr, all arranged in juxtaposition between the input and output shafts 103 and 1016. The first-speed gear train G1 is comprised of a driving gear 1017 connectible to the input shaft 103 through a first-speed clutch C1, and a driven gear 1018 connectible to the output shaft 1016 through a one-way clutch C0 and engaging with the driving gear 1017. The second-speed gear train G2 is comprised of a driving gear 1019 connectible to the input shaft 103 through a second-speed clutch C2, and a driven gear 1020 secured to the output shaft 1016 and engaging with the driving gear 1019, while the third-speed gear train G3 is comprised of a driving gear 1021 secured to the input shaft 103, and a driven gear 1022 connectible to the output shaft 1016 through a third-speed clutch C3 and engaging with the driving gear 1021. The fourth-speed gear train G4 is comprised of a driving gear 1023 connectible to the input shaft 103 through a fourth-speed clutch C4, and a driven gear 1024 connectible to the output shaft 1016 through a selector clutch Cs and engaging with the driving gear 1023. On the other hand, the reverse gear train Gr is comprised of a driving gear 1025 formed integrally with the driving gear 1023 of the fourth-speed gear train G4, a driven gear 1026 connectible to the output shaft 1016 through the selector clutch Cs, and an idle gear 1027 engaging with the gears 1025 and 1026. The selector clutch Cs is arranged between the driven gears 1024 and 1026 of the fourth-speed gear train G4, and has a selector sleeve S which is shiftable between a left or forward position and a right or reverse position as viewed in FIG. 7, to selectively connect the driven gear 1024 or the driven gear 1026 to the output shaft 1016. The one-way clutch C0 permits the driving torque from the engine 1 alone to be transmitted to the driving wheels W, W', while inhibiting transmission of torque from the driving wheels W, W' to the engine 1.

If the first-speed clutch C1 alone is engaged while the selector sleeve S is held in the forward position as illustrated in FIG. 7, the driving gear 1017 is connected to the input shaft 103 to establish the first-speed gear train G1, thereby allowing transmission of torque from the input shaft 103 to the output shaft 1016 therethrough. Then, if the second-speed clutch C2 is engaged with the first-speed clutch C1 maintained in its engaged state, the driving gear 1019 is connected to the input shaft 103 to establish the second-speed gear train G2 through which torque can be transmitted from the input shaft 103 to the output shaft 1016. That is, even while the first-speed clutch C1 is engaged, the second-speed gear train G2, the third-speed gear train G3 or the fourth-speed gear train G4 can be established by the action of the one-way clutch C0, rendering the first-speed gear train G1 substantially inoperative. If the second-speed clutch C2 is disengaged and the third-speed clutch C3 is engaged instead, the driven gear 1022 is connected to the output shaft 1016 to establish the third-speed gear train G3, while if the third-speed clutch C3 is disengaged and the fourth-speed clutch C4 is engaged instead, the driving gear 1023 is connected to the input shaft 103 to thereby establish the fourth-speed gear train G4. On the other hand, if the fourth-speed clutch C4 alone is engaged while the selector sleeve S of the selector clutch Cs is shifted to the right or reverse position, as viewed in FIG. 7, the driving gear 1025 and the driven gear 1026 are connected, respectively, to the input shaft 103 and the output shaft 1016 to establish the reverse gear train Gr, through which reverse torque is transmitted from the input shaft 103 to the output shaft 1016.

The torque transmitted to the output shaft 1016 is then transmitted through an output gear 1028 mounted on one end of the output shaft 1016 to an enlarged gear DG of the differential Df. A gear Ds is secured to the enlarged gear DG and engaged with a gear 1029, and a speedometer cable 1030 has one end thereof secured to the gear 1029 and the other end to a speedometer 1032 of the vehicle via a magnet 1031a of the vehicle speed sensor 24, respectively. The magnet 1031a is thus driven through the gears Ds and 1029 and the speedometer cable 1030 to indicate the traveling speed of the vehicle, while the vehicle speed sensor 24 is comprised of the aforementioned magnet 1031a, and a reed switch 1031b driven by the magnet 1031a, for instance. Rotation of the magnet 1031a in unison with the speedometer cable 1030 causes alternate closing and opening of the reed switch 1031b, and an on-off signal indicative of closing and opening of the reed switch 1031b is supplied to the ECU 5.

Arranged on the main shaft 103 is a rotational speed sensor 1040 of a magnetic pickup type for detecting the rotational speed Nm of the main shaft 103, an output signal of which is delivered to the ECU 5. An output signal indicative of the rotational speed NH of the counter shaft 1016 obtained from the speedometer cable 1030 is also delivered to the ECU 5. An input/output rotational speed ratio ECL, i.e. the ratio of the counter shaft rotational speed NH to the main shaft rotational speed Nm can be expressed as (NH x r)/Nm, where r represents the change gear ratio between the main shaft 103 and the counter shaft 1016. The input/output rotational speed ratio ECL assumes 1.0 when there occurs no slip in the selected speed clutch, while it assumes a value less than 1.0 when a slip occurs in the selected speed clutch.

Figure 8:
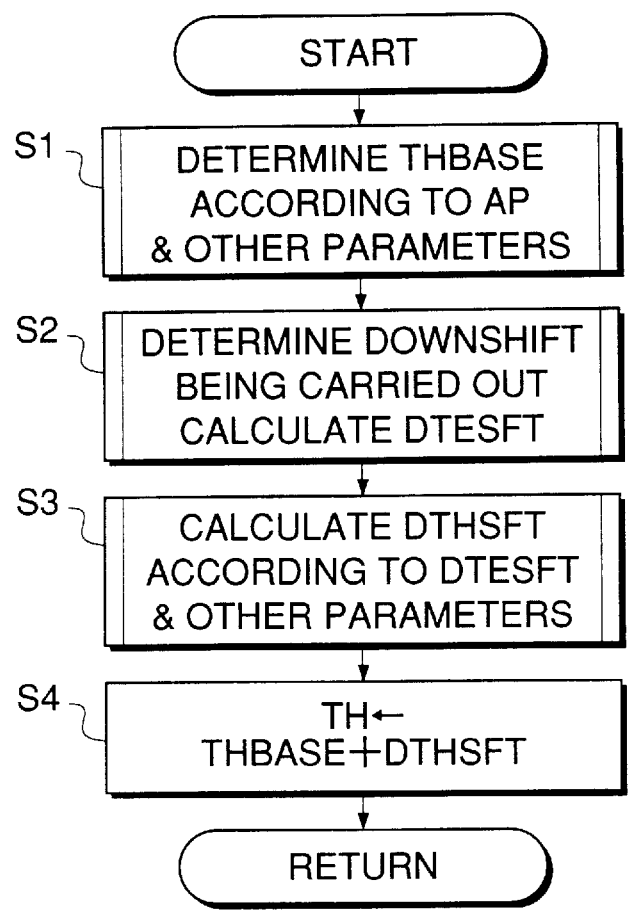
FIG. 8 is a flowchart showing a main routine for carrying out engine output torque control processing, which is executed by an ECU in FIG. 6.
Figure 9:
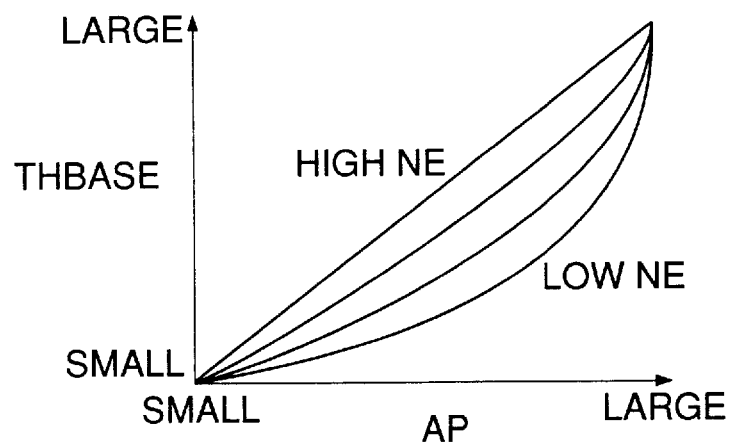
FIG. 9 is a graph showing the relationship between a basic value THBASE of throttle valve opening TH, accelerator pedal position AP, and engine rotational speed NE.

FIG. 8 shows a main routine for carrying out engine output torque control processing which is executed by the ECU 5. This processing is repeatedly executed at predetermined time intervals set by a timer. First, at a step S1, a basic value THBASE of the throttle valve opening TH is determined according to the accelerator pedal position AP and the engine rotational speed NE. FIG. 9 is a graph showing the relationship between the basic throttle valve opening THBASE, the accelerator pedal position AP, and the engine rotational speed NE.

Then, it is determined at a step S2 whether or not gear shifting of the automatic transmission 26 is being carried out, from outputs from the accelerator pedal position sensor 25 and the gear position sensor 26a. Then, a torque correction amount DTESFT for reducing a shock caused by gear shifting is calculated depending on the result of the determination. When gear shifting is being carried out, the torque correction amount DTESFT is calculated in response to gear-shifting conditions which change every moment according to the speed position SFT, the output torque from the engine (engine rotational speed NE and intake pipe absolute pressure PBA), the change gear ratio of the transmission, the vehicle speed VP, etc. According to the present embodiment, when an upshift takes place, the torque correction amount DTESFT is calculated by taking into account a limiting coefficient KSP, referred to hereinafter.

The timing of calculation of the torque correction amount DTESFT will now be described hereinbelow.

FIG. 10 is a timing chart showing the relationship in timing between the driving force of the vehicle, required engine output torque and the engine rotational speed NE during an upshift. In the figure, the broken lines indicate characteristics obtained according to the prior art, for comparison purposes. When a downshifting command is issued and delivered to the hydraulic pressure control circuit 26 from the CPU of the ECU 5, based on the outputs from the accelerator pedal position sensor 25 and the gear position sensor 26a, gear-shifting linear solenoid valves of the gear mechanism are driven based on gear-shifting conditions (e.g. first-speed position→ second-speed position, second-speed position→ third-speed position, third-speed position→ second-speed position, etc.). However, a delay time exists between the time the linear solenoid valve for the clutch of the target speed position starts to be driven and the time the operating hydraulic pressure actually rises, and therefore execution of the torque correction amount DTESFT-calculation at the step S2 in FIG. 8 is delayed until the operating hydraulic pressure rises. The torque correction amount DTESFT is kept at 0 until the start of the calculation.

When the delay time has elapsed and the target speed position clutch starts to be engaged, calculation of the torque correction amount DTESFT at the step S2 is executed. At the step S2, a maximum value of the torque correction amount DTESFT is calculated based on the gear shifting conditions, a number of times of addition to be effected until the calculated maximum value is reached is calculated, and a torque increment DTEUP1 per one time of addition is calculated by dividing the maximum value by the number of times of addition. That is, the engine output torque is increased by adding the torque increment DTEUP1 to a last value of the torque correction amount DTESFT to thereby obtain a present value of DTESFT. When the addition is carried out the number of times of addition, the torque correction amount DTESFT reaches the maximum value. Thereafter, the maximum value of DTESFT is held, i.e. applied, until release of the speed clutch selected before the gear shifting is detected from a change in the engine rotational speed NE.

Then, a torque decrement DTEUP2 is calculated based on the gear shifting conditions detected at the time of detection of the release of the formerly selected clutch, and the torque correction amount DTESFT is set to the calculated torque decrement DTEUP2. Thereafter, the thus set torque correction amount DTESFT is held, i.e. applied, until completion of the gear shifting is detected from a change in the engine rotational speed NE. When the completion of the gear shifting is detected, the torque correction amount DTESFT is set to 0.

Thus, the torque correction amount DTESFT is calculated at the above described timing. That is, it is basically set to a positive value at the start of an upshift which decreases the change gear ratio of the automatic transmission 26, i.e. when the transmission is in the torque phase, so as to increase the engine output torque. On the other hand, when the upshift is completed, i.e. when the transmission is in the inertia phase, the value DTESFT is set to a negative value so as to decrease the engine output torque, to thereby reduce a shock caused by the upshift. When no gear shifting is effected, the torque correction amount DTESFT is set to 0. When the torque correction amount DTESFT is equal to 0, the throttle valve opening TH is not substantially changed by processing described hereinafter.

Next, description will be made of a manner of calculating the torque correction amount DTESFT during an upshift, according to the present embodiment. The torque correction amount DTESFT employed during an upshift is calculated by the use of the following equation (2):

$$DTESFT = DTENG \times KSP \qquad (2)$$

where DTENG represents a torque correction amount employed during an upshift of the transmission in a normal clutch torque state in which no slip occurs in the selected speed clutch. The value DTENG is calculated at a step S603 in FIG. 11, referred to hereinafter.

Figure 11:
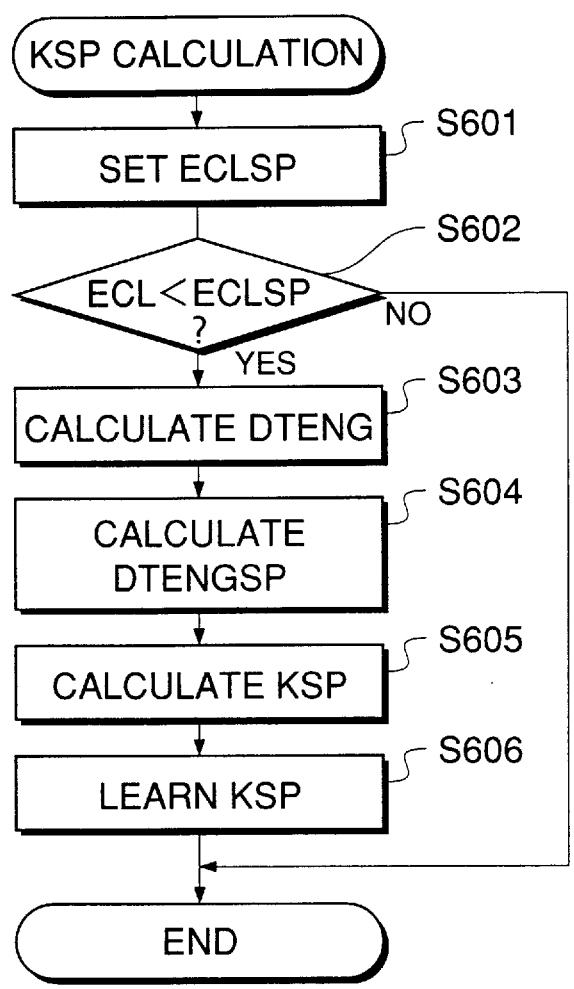
FIG. 11 is a flowchart showing a subroutine for calculating a limiting coefficient KSP, which is executed at a step S2 in FIG. 8.

KSP represents a limiting coefficient for providing an upper limit value of the correction amount DTENG, which is calculated at a step S605 in FIG. 11, referred to hereinafter, by the use of the following equation (3). The limiting coefficient KSP assumes a value equal to or less than 1.0:

$$KSP = DTENGSP / DTENG \qquad (3)$$

where DTENGSP represents a value of the torque correction amount DTENG assumed when the input/output rotational speed ratio ECL becomes equal to a threshold value ECLSP for determining that a predetermined amount of slip has occurred in the selected speed clutch.

Next, detailed description will be made of the limiting coefficient KSP-calculating processing with reference to FIG. 11. This processing is executed at the step S2 in FIG. 8 by the ECU 5.

First, the threshold value ECLSP for determining that the predetermined amount of slip has occurred in the selected speed clutch is set at a step S601. This threshold value ECLSP is set to a predetermined fixed value, e.g. 0.8.

Next, it is determined at a step S602 whether or not the input/output rotational speed ratio ECL is smaller than the predetermined threshold value ECLSP. If ECL ≧ ECLSP holds, the program is immediately terminated, whereas if ECL<ECLSP holds, the program proceeds to the step S603.

At the step 603, the torque correction amount DTENG for a normal clutch torque state is calculated by the use of the following equation (4):

$$DTENG = ((rOFF/rON) \times TENG - TENG) \times KSP \qquad (4)$$

where rOFF represents the change gear ratio of the formerly selected speed clutch, rON the change gear ratio of the target speed position clutch, and TENG the engine output torque. The engine output torque TENG is determined from a map, not shown, according to the engine rotational speed NE and the intake pipe absolute pressure PBA. The limiting coefficient KSP is initially set to 1.0.

Figure 12:
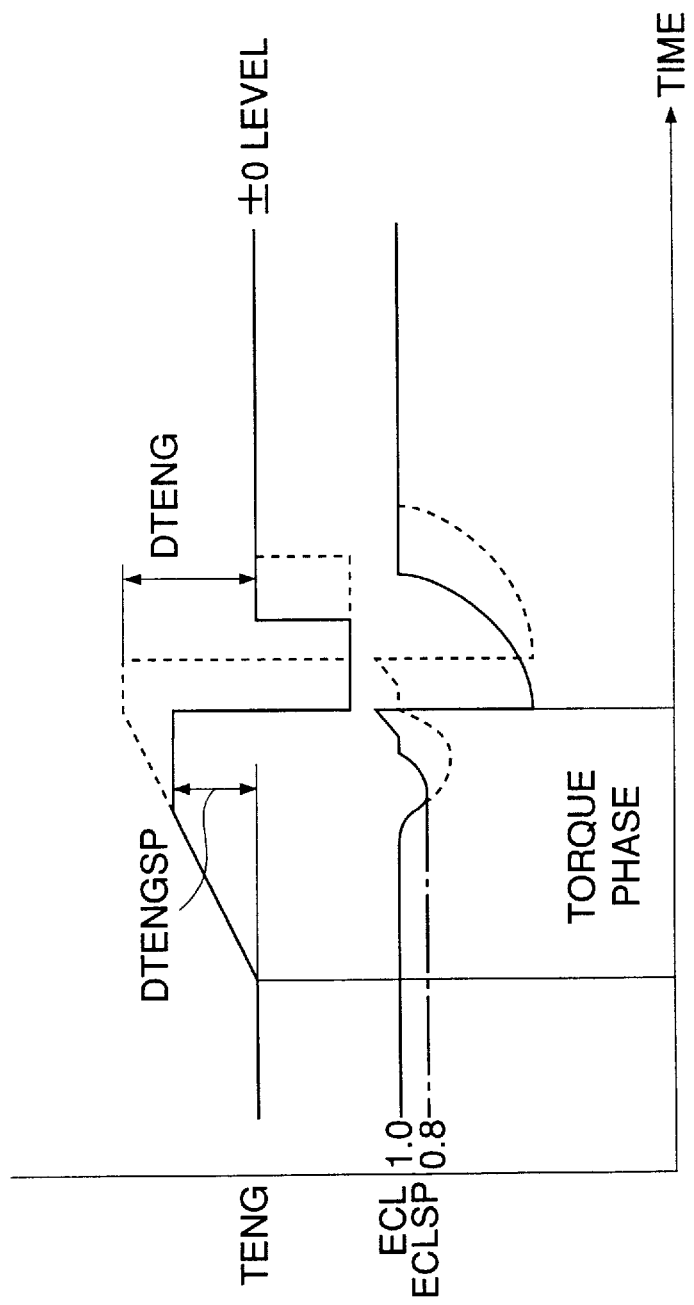
FIG. 12 is a timing chart useful in explaining a manner of controlling the engine output torque control during an upshift.

At the following step S604, the upper limit value DTENGSP of the torque correction amount DTENG is determined in the following manner:

FIG. 12 is a timing chart useful explaining a manner of controlling the engine output torque during an upshift. When the transmission is in the torque phase, the input/output rotational speed ratio ECL continues to assume 1.0 so long as there occurs no slip in the selected speed clutch, while it falls below 1.0 when the engine output torque is increased by the torque correction amount DTESFT and hence a slip occurs in the selected speed clutch. At this time, if the torque correction amount is continuously increased toward the torque correction amount DTENG, the input/output rotational speed ratio ECL further decreases, as indicated by the broken line in FIG. 12, and hence the slip amount of the selected speed clutch increases, to thereby incur the aforementioned inconveniences.

Therefore, according to the present embodiment, the torque correction amount DTENG assumed when the input/output rotational speed ratio ECL becomes equal to the threshold value ECLSP (when the ECL value becomes equal to 0.8 in the present embodiment) is set to the upper limit value DTENGSP. By this setting, the torque correction amount DTESFT is limited to a value obtained by multiplying the torque correction amount DTENG by the limiting coefficient KSP, i.e. to the upper limit value DTENGSP under the same gear-shifting condition. Thereafter, the increase of the engine output torque is effected such that the torque correction amount does not exceed the upper limit value DTENGSP.

Referring again to FIG. 11, at the following step S605, the limiting coefficient KSP is calculated by the use of the above equation (3). Then, at a step S606, the calculated limiting coefficient KSP is learned in a known manner, and the learned value is stored in a nonvolatile memory in the ECU 5, followed by terminating the present routine.

The limiting coefficient KSP is calculated and learned for each gear-shifting condition, and it is used when the next upshift takes place under the same gear-shifting condition. For example, a value KSP2-3 of the limiting coefficient KSP obtained when the transmission is upshifted from the second-speed position to the third-speed position at a certain value (e.g. 10°) of the throttle valve opening TH, is applied at an upshift from the second-speed position to the third-speed position effected at every value of the throttle valve opening TH. Since the learned value obtained by learning the limiting coefficient KSP is stored in the nonvolatile memory, it is held until a battery of the engine 1 is removed for exchange with a new one or other purposes.

Referring again to FIG. 8, the torque correction amount DTESFT for an upshift is calculated based on the above calculated limiting coefficient KSP, by the use of the above equation (2).

Figure 13:
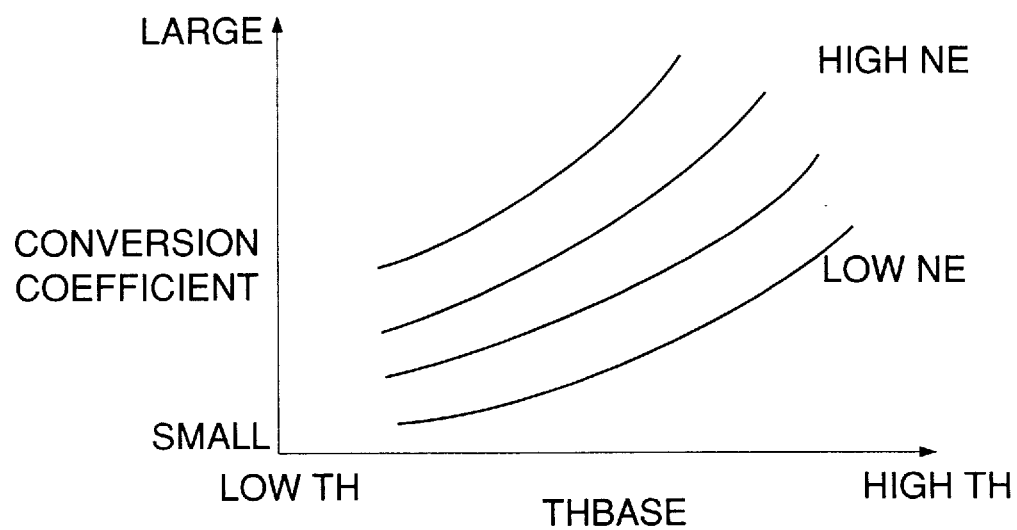
FIG. 13 is a graph showing the relationship between a conversion coefficient, the engine rotational speed NE, and the basic throttle valve opening THBASE.

Then, at a step S3, a throttle valve opening correction amount DTHSFT is calculated based on the above calculated torque correction amount DTESFT. More specifically, the throttle valve opening correction amount DTHSFT is obtained by multiplying a conversion coefficient which is retrieved from a map according to the engine rotational speed NE and the basic throttle valve opening THBASE, by the torque correction amount DTESFT. FIG. 13 shows the map for determining the conversion coefficient. The conversion coefficient is set to a larger value as the engine rotational speed NE is higher and/or the basic throttle valve opening THBASE is larger.

Then, throttle valve control is carried out at a step S4. More specifically, the throttle valve opening TH is set to a value obtained by adding the throttle valve opening correction amount DTHSFT to the basic throttle valve opening THBASE, followed by terminating the present routine. Thus, the throttle valve 3 is driven to the set throttle valve opening TH through the throttle valve actuator 23.

According to the present embodiment, when the output torque from the engine is increased in the torque phase during an upshift, the engine output torque control amount is limited to the torque correction amount assumed at a time point when the input/output rotational speed ratio ECL just drops below the threshold value ECLSP. As a result, even when the clutch torque lowers due to decrease of the friction coefficient of the selected speed clutch, a rise delay in the hydraulic pressure for operating the clutch, or other factors, the increase of the engine output torque can be controlled in a manner maintaining the optimal balance between the clutch torque and the engine output torque. That is, the engine output torque can be controlled within a range where no slip occurs in the selected speed clutch. As a result, it is possible to prevent degradation of the durability of a selected speed clutch of the automatic transmission, due to heat caused by a slip in the clutch during an upshift, while reducing a shock generated during the upshift, which would otherwise be caused by an excessive increase in the engine rotational speed NE.

Further, the limiting coefficient KSP is calculated and learned for each gear-shifting condition, and the thus learned value is applied at subsequent upshifts, and therefore, the engine output torque can be controlled in a manner maintaining the optimal balance between the clutch torque and the engine output torque in every kind of upshift.

Although in the above described embodiment, engine output torque-decreasing control is carried out by controlling the opening of the throttle valve, this is not limitative. Alternatively, the engine output torque-decreasing control may be carried out by retarding the ignition timing of the engine. In this case, a retard amount of the ignition timing is calculated based on the torque correction amount DTESFT, and the engine output torque can be decreased by retarding a basic ignition timing based, e.g. on the engine rotational speed NE and the intake pipe absolute pressure PBA by the calculated retard amount.

What is claimed is:

1. An output torque control system for an internal combustion engine for a vehicle, said engine having an automatic transmission having a plurality of clutches, the control system being operable during an upshift of said automatic transmission, for increasing output torque from said engine, based on a control amount for increasing said output torque, to reduce a shock generated by said upshift, the control system comprising:

comparing means operable during said upshift of said automatic transmission, for comparing a slip amount of one of said plurality of said clutches of said automatic transmission which is selected for said upshift with a predetermined value;

control amount-calculating means for calculating a value of said control amount assumed when said slip amount of said one clutch becomes equal to said predetermined value, as a result of the comparison by said comparing means; and limiting means for limiting said control amount to said value calculated by said control amount-calculating means when said slip amount exceeds said predetermined value, as a result of the comparison by said comparing means.

2. An output torque control system as claimed in claim 1, wherein said automatic transmission has an input side and an output side, said slip amount of said one clutch being detected based on rotational speed of said input side of said automatic transmission and rotational speed of said output side of said automatic transmission.

3. An output torque control system as claimed in claim 2, wherein said comparing means detects that said slip amount exceeds said predetermined value when a ratio of said rotational speed of said output side of said automatic transmission to said rotational speed of said input side of said automatic transmission falls below a predetermined threshold value.

4. An output torque control system as claimed in claim 1 or 2, including control amount ratio-calculating means for calculating a control amount ratio of said value of said control amount assumed when said slip amount of said one clutch becomes equal to said predetermined value to a value of said control amount assumed when no slip occurs in said one clutch, and learning means for learning said control amount ratio calculated by said control amount ratio-calculating means.

5. An output torque control system as claimed in claim 4, wherein said limiting means limits said control amount to a value obtained by multiplying said value of said control amount assumed when no slip occurs in said one clutch by said control amount ratio calculated by said control amount ratio-calculating means.

* * * * *